United States Patent [19]

Naruto

[11] 4,449,077
[45] May 15, 1984

[54] CHOPPER CONTROL EQUIPMENT FOR ELECTRIC RAILCARS

[75] Inventor: Masashi Naruto, Osaka, Japan

[73] Assignee: Mitsubishi Denki Kabushiki Kaisha, Tokyo, Japan

[21] Appl. No.: 377,995

[22] Filed: May 13, 1982

[30] Foreign Application Priority Data

May 27, 1981 [JP] Japan .................. 56-80555

[51] Int. Cl.³ .............................. H02P 5/50
[52] U.S. Cl. .............................. 318/6; 318/7; 318/60; 318/87
[58] Field of Search ................ 318/4-8, 318/53, 56, 57, 60, 63, 86-89, 376-381; 105/61

[56] References Cited

U.S. PATENT DOCUMENTS

| | | | |
|---|---|---|---|
| 3,569,811 | 3/1971 | Miller et al. | 318/381 |
| 3,878,447 | 4/1975 | MacDonald | 318/381 |
| 4,092,577 | 5/1978 | Markham | 318/381 |
| 4,095,154 | 6/1978 | Williamson | 318/381 |
| 4,259,622 | 3/1981 | Kamenicky et al. | 318/86 |
| 4,309,642 | 1/1982 | Boden et al. | 318/53 |
| 4,337,706 | 7/1982 | Loosli | 105/61 |
| 4,355,267 | 10/1982 | Franz, Jr. et al. | 318/63 |
| 4,363,999 | 12/1982 | Preikschat | 318/53 |

OTHER PUBLICATIONS

"Marta Propulsion System", UITP Meeting, Choppers, Sep. 1978, pp. 9 and 11.
"La Nouvelle Locomotive CC Serie 20,3 KV a Hacheur de Tension, de la Societe Nationale des Chemins de Fer Belges: SNCB", Revue de l'Assoc. Fransaise de Amis des CHEMIN DE FER 1975-6, No. 315, pp. 246-250.

*Primary Examiner*—G. Z. Rubinson
*Assistant Examiner*—Arthur G. Evans
*Attorney, Agent, or Firm*—Wenderoth, Lind & Ponack

[57] ABSTRACT

When a plurality of shunt motors connected in parallel are used for driving an electric railcar the, differences in the characteristics of the motors introduced during the manufacturing thereof causes the armature currents to vary greatly even when they are running at the same speed. To control the field current by means a single device, therefore, the armature currents must be corrected by armature choppers. In order to fully recover the kinetic energy possessed by the electric railcar, the present invention automatically corrects for the difference in the characteristics of the shunt motors so that the required braking force is uniformly borne by each of the shunt motors.

3 Claims, 4 Drawing Figures

CHOPPER CONTROL EQUIPMENT FOR ELECTRIC RAILCARS

BACKGROUND OF THE INVENTION

The present invention relates to chopper control equipment for electric railcars, which smoothly and accurately controls the regenerative braking by compensating for the differences in characteristics of a plurality of motors, when the speed of d-c shunt motors in an electric railcar is to be controlled by relying upon the chopper control of the armature voltage or armature current of the motors and relying upon a field exciting device.

Owing to the development in semiconductor elements, most of the electric railcars have been controlled by relying upon d-c chopper circuits. In particular, high sticking performance is required between the wheels and the rails for the electric locomotives. For this purpose, an attempt has been made to use d-c shunt motors and drive motors and to connect a plurality of motors in parallel. Moreover, it has been attempted to separately control the currents that flow into the armatures which are connected in parallel by independent armature chopper means, i.e., by controlling the armature voltage or the armature current by chopper circuits, so that stickiness of the wheels to the rails can be individually controlled even when some wheels undergo racing on the rails, in order to minimize the decrease of tractive force as a whole.

With the shunt motors, however, the field current characteristics change little with changes in the speed. Therefore, if different characteristics are imparted to the motors during their manufacture, greatly different armature currents flow even at the same speed. To control the field currents for a plurality of motors, therefore, the differences in the armature currents must be compensated by the above-mentioned armature chopper. This means that the controllable range of the armature chopper is narrowed. In particular, an armature chopper which is not set to a minimal conduction ratio in a high-speed regenerative braking region means that the armature voltage is decreased, and the kinetic energy possessed by the electric railcar is not fully recovered. This problem can be solved if the currents flowing into the shunt windings of the motors are separately controlled. This, however, necessitates exciting devices for each of the motors, and results in increased size, increased weight, and increased manufacturing costs.

FIG. 1 shows regenerative brake-notch curves obtained by a conventional control system, in which curves A and B represent characteristics when the same current If is allowed to flow into motors having difference characteristics so as to operate them at a minimum conduction ratio (0.1 in this case) of the armature choppers. For the purpose of easy understanding, FIG. 1 illustrates the case when there are two electric motors. Since the matter resides in the differences in the characteristics, no problem arises even if the motors are represented by only two motors. It will be seen that the armature current IaA and IaB differ greatly even at the same speed $V_1$, and the braking forces to be born therefore differ greatly. Namely, the wheel tends to skid on the rail in the case of the curve B and, furthermore, problems arise with regard to the heat that is generated in the motor since a large armature current flows.

SUMMARY OF THE INVENTION

The present invention is concerned with chopper control equipment for an electric railcar which employs a plurality of d-c shunt motors as drive motors, which has a plurality of armature chopper control devices for independently controlling the currents that flow into the motors, and which has an exciting device which controls currents that flow into the shunt windings, wherein maximum values in the armature currents are detected and are multiplied by the field currents to produce braking-force signals that will be fed back to the field control system that controls the braking force, and a maximum value consisting of a reference instruction value and a practical armature current of another motor is given as an instruction value for the armature control systems which control armature currents, to thereby control the regenerative braking.

DESCRIPTION OF THE PREFERRED EMBODIMENT

Figure 2:
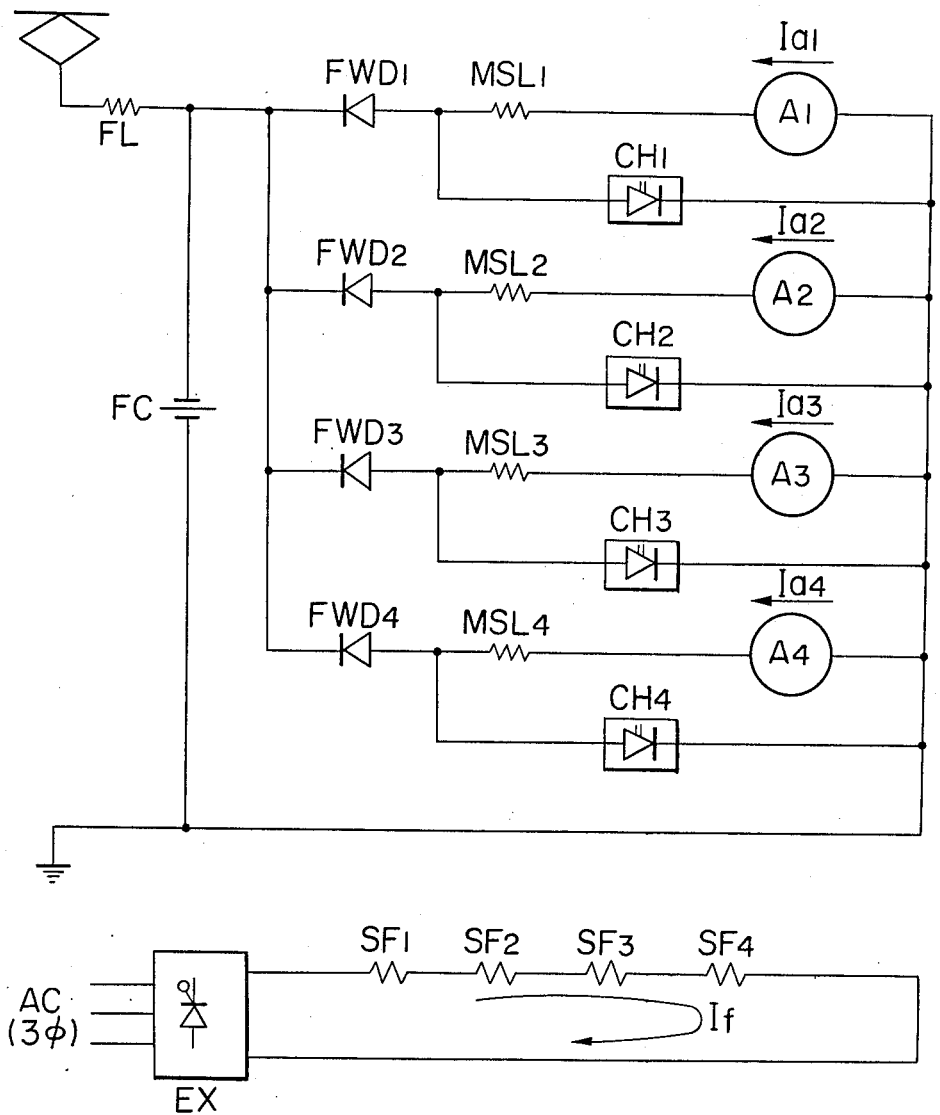
FIG. 2 is a diagram of a main circuit of a regenerative brake for an electric railcar according to an embodiment of the present invention.

FIG. 2 is a diagram of a main circuit of a regenerative brake for an electric railcar according to an embodiment of the present invention, in which FL denotes a filter reactor, FC denotes a filter capacitor, $FWD_1$ to $FWD_4$ denote free wheeling diodes, $MSL_1$ to $MSL_4$ denote main smoothing reactors, $CH_1$ to $CH_4$ denote choppers, $A_1$ to $A_4$ denote armatures, $SF_1$ to $SF_4$ denote shunt fields, and EX denotes an exciting device. In FIG. 2, furthermore, $Ia_1$ to $Ia_4$ denote armature currents, and If denotes a current which flows through the shunt fields.

Figure 4:
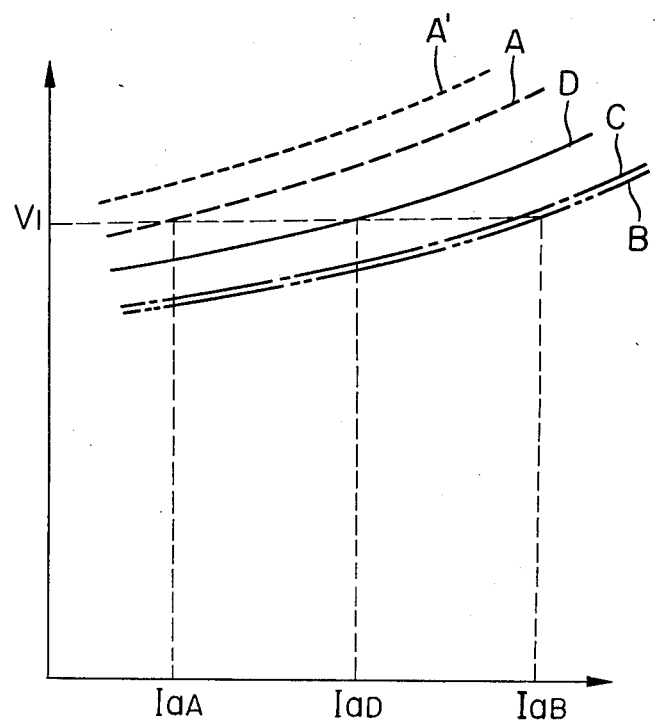
FIG. 4 is a diagram of regenerative brake-notch curves according to the control equipment of the present invention.
Figure 3:
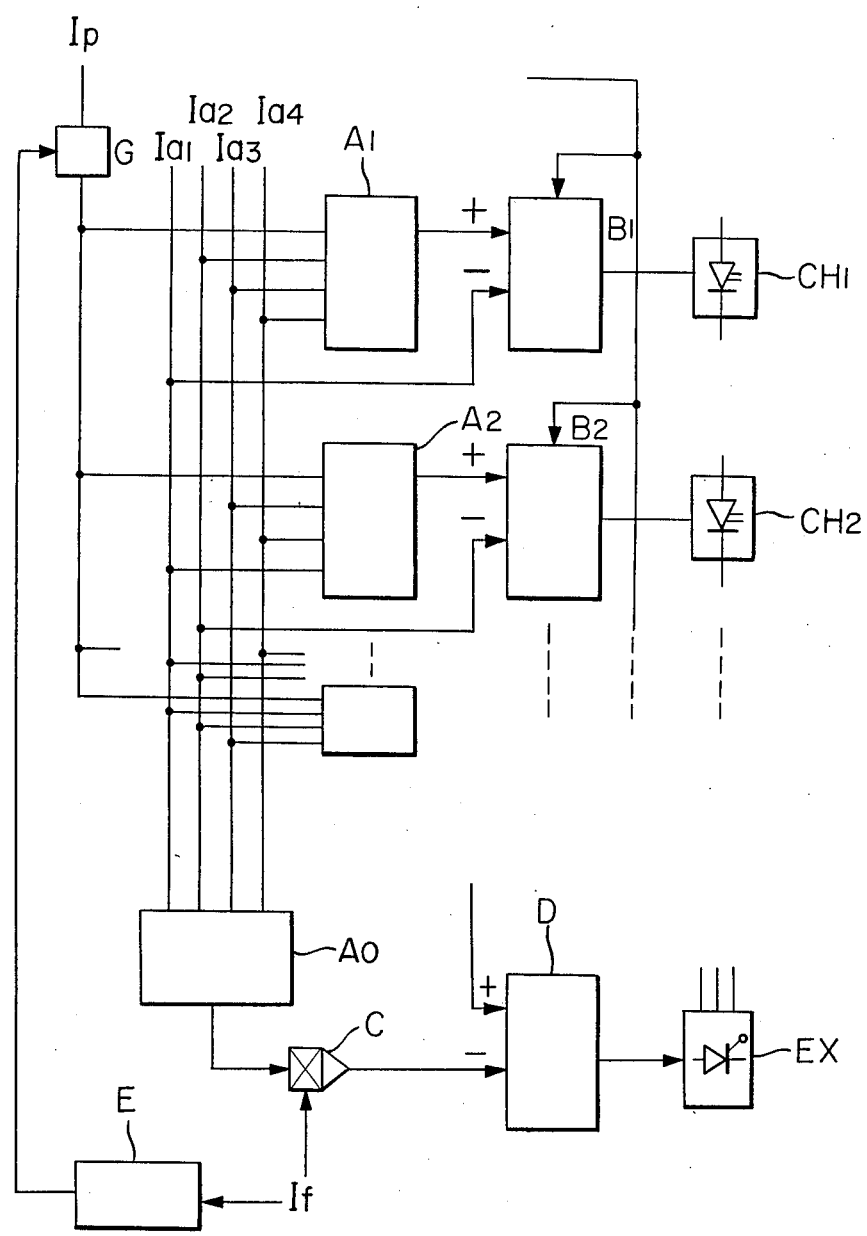
FIG. 3 is a block diagram of control equipment according to an embodiment of the present invention.

FIG. 3 is a block diagram showing a control system according to the present invention, and FIG. 4 is a diagram of regenerative brake-notch curves when the system of the present invention is put into practice.

First, the armature chopper No. 1 is described as a representative example with reference to FIG. 3. For easy comprehension, the fundamental control is described with $Ia_1 = Ia_2 = Ia_3 = Ia_4$. In FIG. 3, furthermore, $A_0$ denotes a circuit for detecting a maximum value of the armature currents, $A_1$ and $A_2$ denote circuits for detecting maximum values consisting of armature currents and instruction values therefor, $B_1$ and $B_2$ denote a first armature control system and a second armature control system, $CH_1$ and $CH_2$ denote choppers, C denotes a multiplier, D denotes a shunt field control system, and E denotes a circuit for detecting a maximum value in the field current.

The field current If is small in the high-speed regions, and the gate G of Ip remains closed and the first armature chopper $CH_1$ operates on an instruction for a minimum conduction ratio. Then, a real braking force which is the product of $Ia_1$ and If is fed back to the shunt field control system and is compared with an instruction of the braking force; i.e., the phase (or conduction ratio) of the exciting device EX is adjusted to control If so as to thereby perform a predetermined torque control. The field current If increases as the railcar decelerates, and reaches a predetermined maximum value, whereby the detector E for detecting a maximum field current If operates to open the gate of Ip. In this case, the field current If has been fixed to Ifmax. The gate G is opened, and Ip is supplied to the armature control system $B_1$ via $A_1$ and is compared with $Ia_1$. The conduction ratio of the first armature chopper $CH_1$ so increases that $Ia_1$ comes into agreement with Ip. Therefore, If remains constant at Ifmax, $Ia_1$ remains constant at Ip, and the control of the constant braking force is effected until the conduction ratio reaches a maximum value just before the railcar comes to a halt.

Figure 1:
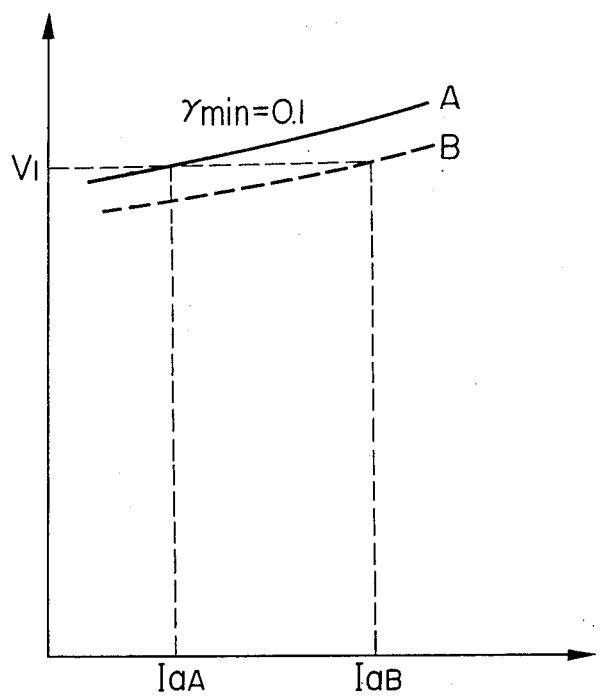
FIG. 1 is a diagram showing regenerative brake-notch curves obtained according to a conventional control equipment.

The following description is for when there is difference in the characteristics of the motors. As mentioned above, the operation is started under the condition in which the gate G of Ip is closed, and the first armature chopper $CH_1$ operates at a minimal conduction ratio. The armature current $Ia_1$ flows. In this case, it is assumed that the motor has characteristics as represented by a curve A in FIG. 4, and the other motors have characteristics as represented by a curve B. Therefore, $Ia_1$ becomes equal to IaA, which, however, is the same as the case of FIG. 1 and presents problem. Here, if a maximum value (which may be represented by the curve B in FIG. 4) in the armature currents $Ia_2$ to $Ia_4$ of other motors is added as a pattern of the first armature control system $B_1$, the first armature control system $B_1$ works to increase the conduction ratio of the chopper $CH_1$ so that $Ia_1$=IaA will become in agreement with IaB. If only the above function is performed, a curve C which is in agreement with the curve B is obtained, resulting in the increase in the resultant braking force. However, since a maximum value IaB is used as an armature current that will be fed back as a braking force to the field control system, the braking force inevitably becomes greater than a desired braking force instruction value. Therefore, the control system quickly works to reduce the field current If and if the characteristics represented by a curve D in FIG. 4 are assumed, i.e., the field intensity for all of the motors is reduced so as to be smaller than that of the curve B or C. When the conduction ratio of the chopper $CH_1$ is at a minimum, the motor controlled by the chopper $CH_1$ assumes the characteristics as represented by a curve A' under the condition of a weak magnetic field. Owing to the above-mentioned armature control system, however, the conduction ratio increases so that the motor assumes the characteristics as represented by the curve D. The operation is quite the same as the fundamental operation after the point at which a maximum value If is detected as the railcar is decelerated. The armature current Ia is controlled so as to be equal to Ip maintaining precision for each of the motors by the choppers.

According to the present invention, as mentioned above, it is possible to automatically correct for differences in the characteristics of the motors and to uniformly bear the required braking force by each of the motors using control equipment which has an exciting device that controls the shunt fields, which is small in size, which is light in weight, and which is cheaply manufactured.

The foregoing description has dealt with a system in which excitation of the shunt fields are controlled by rectifying the three-phase a-c power source. However, it is also allowable to use a field chopper as an exciting device, which is different from the armature chopper.

What is claimed is:

1. A chopper control system for an electric railcar comprising:
   a plurality of shunt motors having a common field current for driving said electric railcar;
   a plurality of armature choppers for controlling the armatures of said shunt motors;
   a multiplier for multiplying a maximum value of the armature currents of said plurality of shunt motors by said field current of said plurality of shunt motors;
   a shunt field controller for comparing an output of said multiplier with a preset desired instructed braking force value so as to control said field current of said plurality of shunt motors in response to said comparison;
   a maximum-value detector for each of said plurality of shunt motors for comparing armature currents of said plurality of shunt motors other than its respective shunt motor with a reference instruction value of armature current so as to produce a signal corresponding to a maximum value of said comparison; and
   an armature controller for each of said plurality of shunt motors for providing a signal corresponding to a maximum value consisting of the armature current of its respective shunt and said signal of maximum value from its respective maximum value detector; wherein said armature controller signal is used to control said armature current of its respective shunt motor that is to be controlled.

2. A chopper control system for an electric railcar according to claim 1, wherein the armature current is multiplied by the field current by a multiplier when the field current is smaller than a predetermined value.

3. A chopper control system for an electric railcar according to claim 1, wherein a preset reference value of armature current is fed to each of said maximum-value detectors when a maximum value of field current is detected by a maximum-value field current detector, wherein the conduction ration of said plurality of armature choppers is controlled in accordance with said preset reference value.

* * * * *